United States Patent
Nishihata et al.

(10) Patent No.: US 8,158,242 B2
(45) Date of Patent: *Apr. 17, 2012

(54) STOCK SHAPE FOR MACHINING AND PRODUCTION PROCESS THEREOF

(75) Inventors: Naomitsu Nishihata, Tokyo (JP); Tatsuya Kawasaki, Tokyo (JP)

(73) Assignee: Kureha Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/031,800

(22) Filed: Feb. 22, 2011

(65) Prior Publication Data

US 2011/0143117 A1  Jun. 16, 2011

Related U.S. Application Data

(62) Division of application No. 10/589,436, filed as application No. PCT/JP2005/002502 on Feb. 9, 2005.

(30) Foreign Application Priority Data

Feb. 16, 2004 (JP) ................................ 2004-038076

(51) Int. Cl.
*B32B 7/02* (2006.01)
(52) U.S. Cl. ............ 428/212; 428/174; 439/55; 439/86; 361/760; 524/495; 524/496
(58) Field of Classification Search .................. 428/174, 428/212; 439/55, 86; 361/760; 524/495, 524/496

See application file for complete search history.

(56) References Cited

U.S. PATENT DOCUMENTS

| 6,545,081 B1 | 4/2003 | Nishihata et al. |
| 7,198,734 B2 | 4/2007 | Nishihata et al. |
| 2004/0082205 A1 | 4/2004 | Nishihata et al. |

FOREIGN PATENT DOCUMENTS

| CN | 1333800 | 12/1999 |
| EP | 1376782 | 1/2004 |
| JP | 07-314520 | 12/1995 |
| JP | 09-087418 | 3/1997 |
| JP | 11-323131 | 11/1999 |
| JP | 2000-017180 | 1/2000 |
| JP | 2000-212453 | 8/2000 |
| JP | 2002-052619 | 2/2002 |
| JP | 2002-080720 | 3/2002 |
| JP | 2002-121402 | 4/2002 |
| JP | 2002-531660 | 9/2002 |
| JP | 2003-335957 | 11/2003 |
| WO | 00/34369 | 12/1999 |
| WO | 00/34369 | 6/2000 |
| WO | 02/082592 | 10/2002 |

OTHER PUBLICATIONS

Chinese Patent Office Action dated Jul. 7, 2008, in Chinese with English translation.
International Search Report, Apr. 14, 2005.

*Primary Examiner* — Mark Ruthkosky
*Assistant Examiner* — Lawrence Ferguson
(74) *Attorney, Agent, or Firm* — Porter Wright Morris & Arthur

(57) ABSTRACT

A stock shape for machining, which is composed of an extruded product of a resin composition comprising 30 to 94% by mass of a thermoplastic resin (A), 5 to 40% by mass of a carbon precursor (B) having a volume resistivity of $10^2$ to $10^{10}$ Ω·cm and 1 to 30% by mass of a conductive filler (C) having a volume resistivity lower than $10^2$ Ω·cm and has a thickness or diameter exceeding 3 mm, and a process for producing the stock shape by extrusion and solidification of the resin composition.

9 Claims, 2 Drawing Sheets

US 8,158,242 B2

STOCK SHAPE FOR MACHINING AND PRODUCTION PROCESS THEREOF

CROSS-REFERENCE TO RELATED APPLICATIONS

This application is a division of, and claims the benefit under 35 U.S.C. §120 of the earlier filing date of, copending U.S. patent application Ser. No. 10/589,436 filed on Aug. 15, 2006, which is a U.S. National Stage patent application of International Application No. PCT/JP2005/02502 filed on Feb. 9, 2005, and claims the benefit under 35 U.S.C. §119 of the earlier filing date of Japanese Patent Application No. 2004-038076 filed on Feb. 16, 2004.

TECHNICAL FIELD

The present invention relates to a stock shape for machining, which is composed of an extruded product of a thermoplastic resin material and used in secondarily forming into a formed product of a desired shape by machining such as cutting, drilling and/or shearing. Particularly, the present invention relates to a stock shape for machining, which can be strictly controlled to a desired surface resistivity falling within a semiconductive region, is excellent in mechanical properties, heat resistance, chemical resistance and dimensional stability and also excellent in machinability such as cutting ability and drilling ability, and a production process thereof.

The stock shape for machining according to the present invention can be secondarily formed into various formed products by machining such as cutting, drilling and/or shearing. The stock shape for machining according to the present invention is high in machining accuracy and suitable for forming of various resin parts such as electric and electronic equipment parts and display equipment parts made up of resin materials.

In the present invention, the machining means that a primarily formed product such as a plate or round bar is formed into a secondarily formed product of a desired shape by machine working such as cutting, drilling and shearing that are known as secondary processing for polymeric materials. Since the cutting is representative of the machining, the stock shape for machining according to the present invention may be called a stock shape for cutting in some cases. The stock shape means any materials having shape including a plate, round bar, pipe and special shape.

BACKGROUND ART

Resin materials used in forming or molding of parts used in a fabrication process of semiconductors such as IC and LSI and mount parts thereof, parts used in a fabrication process of magnetic heads and hard disk drives and mount parts thereof, parts used in a fabrication process of liquid display devices and mount parts thereof, or the like are required to have excellent mechanical properties, heat resistance, chemical resistance and dimensional stability.

Therefore, thermoplastic resins excellent in heat resistance, for example, poly(ether ether ketone), poly(ether imide), polysulfone, poly(ether sulfone) and poly(phenylene sulfide), are used as resin materials in this technical field.

With the development of high-density pitch in electronic devices, however, an electronic device tends to be charged by the influence of frictional electrification of a resin part used therein when the resin part is formed by a resin material having a surface resistivity exceeding $10^{13}\Omega/\square$. The electronic device, in which static electricity has been accumulated by charging, may be damaged by discharge of the static electricity or electrostatically absorb dust suspended in the air. In a resin part formed by a resin material having a surface resistivity lower than $10^5\Omega/\square$ on the other hand, the moving speed of electric charge in the resin part is too high, so that a heavy current or high voltage generated upon discharge of static electricity gives an electronic device a fault.

From the viewpoints of protecting the electronic device from the fault by the static electricity and retaining high cleanness without attracting dust, the resin parts used in these technical fields are required to control their surface resistivities within a range of $10^5$ to $10^{13}\Omega/\square$ that is a semiconductive region. Thus, it has heretofore been proposed to use a resin material with an antistatic agent or a conductive filler incorporated therein to obtain a formed or molded product having a surface resistivity in the semiconductive region.

According to the method of incorporating the antistatic agent into the resin material, however, the antistatic agent present on the surface of the resulting molded or formed product is easily removed by washing or friction to lose its antistatic effect. When the amount of the antistatic agent incorporated is increased in order for the antistatic agent to easily bleed from the interior of the molded or formed product to the surface thereof, the antistatic effect can be sustained to some extent. However, dust sticks on the surface of the molded or formed product due to the antistatic agent bled, and the electronic device and an environment are contaminated by exudation and volatilization of the antistatic agent. In addition, when the antistatic agent is used in a great amount, the heat resistance of the resulting molded or formed product is deteriorated.

According to the method of incorporating the conductive filler such as conductive carbon black into the resin material, the electric resistivity of the resulting molded or formed product greatly varies with a little difference of the amount of the conductive filler incorporated or a little change of molding or forming conditions because the electric conductivity of the resin material is widely different from that of the conductive filler. Therefore, it is extremely difficult to strictly control the surface resistivity to a desired value within a range of $10^5$ to $10^{13}\Omega/\square$ by the method of simply incorporating the conductive filler. In addition, according to the method of simply incorporating the conductive filler, a wide scatter of the surface resistivity of the molded or formed product with the locality is liable to occur.

In order to solve the above-described problems, the present applicant proposed a resin composition with a carbon precursor and a conductive filler incorporated in combination into a thermoplastic resin, and molded products such as an IC socket molded with this resin composition (Japanese Patent Application Laid-Open No. 2002-531660 (through PCT route), and International Publication No. WO02/082592). When the molding is conducted with the resin composition comprising such respective components in specific proportions, a molded product with the surface resistivity or volume resistivity thereof strictly controlled within a limited desired range of the semiconductive region can be obtained. These documents disclose Examples, in which the resin composition was injection-molded to produce molded products such as IC sockets.

The above-described resin parts are generally molded by injection molding. According to the injection molding, molded products such as resin parts having a desired shape can be mass-produced. However, resin parts used in an electric and electronic field or the like are required to have high dimensional accuracy, and so a mold for injection molding is naturally required to have high dimensional accuracy.

In addition, since the molded product often deforms due to shrinkage and/or residual stress after the injection molding, the form of the mold for injection molding must be precisely controlled according to the shape of the molded product and properties of the resin material. Therefore, the mold for injection molding generally takes a long time to produce it, and so the production cost thereof is compelled to be expensive. Since fraction defective upon actual injection molding is also high, the cost of products is often increased. In addition, it is difficult to mold a molded product having a great thickness by the injection molding.

On the other hand, it is known to extrude a resin material to produce a stock shape for machining, such as a plate, round bar, pipe or special shape, and subject this stock shape to machining such as cutting, drilling or shearing to form a part of a predetermined shape. The method of machining the stock shape has such merits that parts produced in small quantity can be economically produced compared with the injection molding, the method can cope with frequent changes of part specification, parts high in dimensional accuracy are obtained, and parts having a shape unsuitable for the injection molding or a great thickness can be produced.

However, it is not that any resin material or extruded product is suitable for a stock shape for machining. The stock shape for machining is required to have various properties, for example, (I) to be thick-wall and excellent in machinability, (II) to be low in residual stress, (III) not to be heated in excess by frictional heat generated upon machining to cause neither deformation nor discoloration, and (IV) to be able to be machined with high accuracy to scarcely produce burr upon, for example, drilling.

Most of processing methods used in metallic materials are utilized in machining of polymeric stock shapes as it is. Even in extruded products, those having a thin wall and great flexibility are unsuitable for machining such as cutting. An extruded product too great in residual stress upon extrusion tends to deform upon or after machining, and so it is difficult to obtain a secondarily formed product having high dimensional accuracy.

In order to machine, in particular, a polymeric stock shape into a resin part used in a field of electric and electronic equipment parts, display equipment parts, or the like, it is indispensable that holes of a precise form can be formed by drilling, in addition to that cutting and shearing can be conducted with high accuracy.

An IC socket is used for inspection by a burn-in test in, for example, a semiconductor fabrication process. A great number of contact probes are inserted into a body of the IC socket. In order to form such an IC socket body by machining of a polymeric stock shape, a great number of pin-inserting holes must be formed by drilling. When burr is produced around an opening of each pin-inserting hole, deburring is required, and so operating efficiency is impaired. When a formed product with burr is used, a pin-inserting operation becomes difficult, and an adverse influence on electric and electronic equipments or the like by contamination of an operating environment by separation of burr and attachment of the burr separated is easy to occur.

According to the results of an investigation by the present inventors, it has been found that a formed product obtained by extrusion of a resin composition with conductive carbon black incorporated into a thermoplastic resin is marked in occurrence of burr upon drilling in addition to unstable surface resistivity. The reason why injection molding has heretofore been mainly adopted upon production of a resin part using a resin composition with a conductive filler or the like incorporated into a thermoplastic resin is not only that the injection molding is suitable for mass production of the resin part, but also that an extruded product composed of such a resin composition is considered to be unsuitable for machining.

In fact, the above-described 2 documents that disclose the resin composition with a carbon precursor and a conductive filler incorporated in combination into a thermoplastic resin, and the molded products molded with the resin composition only disclose Examples, in which molded products such as IC sockets were molded by injection molding. These documents also touch on extrusion. However, thin-wall formed particles such as films, sheets and tubes that are unsuitable for cutting and the like are only exemplified. These documents neither teach nor suggest anything about extruded products that are suitable for machining, thick-wall, low in residual stress and excellent in suitability for machining.

DISCLOSURE OF THE INVENTION

It is an object of the present invention to provide a stock shape for machining, which can be strictly controlled to a desired surface resistivity falling within a semiconductive region, is excellent in mechanical properties, heat resistance, chemical resistance and dimensional stability and also excellent in machinability such as cutting ability and drilling ability, and a production process thereof.

More specifically, the object of the present invention is to provide a stock shape for machining, which has a surface resistivity within a semiconductive region, can be secondarily formed into various formed products with high machining accuracy by machining such as cutting, drilling and/or shearing and is suitable for machining into electric and electronic equipment parts, display equipment parts or the like, and a production process thereof.

The present inventors have carried out an extensive investigation with a view toward achieving the above objects. As a result, it has been found that when a resin composition comprising a thermoplastic resin, a carbon precursor having a volume resistivity of $10^2$ to $10^{10}$ $\Omega \cdot cm$ and a conductive filler having a volume resistivity lower than $10^2$ $\Omega \cdot cm$ in specific proportions is extruded and solidified, thereby obtaining a stock shape for machining, such as a plate or round bar, which has a thickness or diameter exceeding 3 mm, can remove residual stress and is suitable for machining such as cutting and drilling.

According to the stock shape for machining of the present invention, a part excellent in dimensional stability can be easily produced by machining such as cutting and drilling, and a part having a thickness of 5 mm or greater, that is hard to be applied by injection molding, may also be formed. The stock shape for machining according to the present invention scarcely produces burr upon drilling and can be precisely processed. In particular, at least two thermoplastic resins are used in combination, whereby the production of burr upon drilling can be markedly inhibited.

The stock shape for machining and a secondarily formed product obtained by machining this stock shape are excellent in mechanical properties, heat resistance, chemical resistance and dimensional stability, each exhibit a stable surface resistivity and also have electrical insulating properties required of resin parts in electric and electronic equipments or the like. The present invention has been led to completion on the basis of these findings.

According to the present invention, there is thus provided a stock shape for machining, which is composed of an extruded product of a resin composition comprising 30 to 94% by mass of a thermoplastic resin (A), 5 to 40% by mass of a carbon precursor (B) having a volume resistivity of $10^2$ to $10^{10}$ Ω·cm and 1 to 30% by mass of a conductive filler (C) having a volume resistivity lower than $10^2$ Ω·cm and has a thickness or diameter exceeding 3 mm.

According to the present invention, there is also provided a process for producing a stock shape for machining, which comprises extruding and solidifying a resin composition comprising 30 to 94% by mass of a thermoplastic resin (A), 5 to 40% by mass of a carbon precursor (B) having a volume resistivity of $10^2$ to $10^{10}$ Ω·cm and 1 to 30% by mass of a conductive filler (C) having a volume resistivity lower than $10^2$ Ω·cm through the following Steps 1 to 3:

(1) a step of feeding the resin composition to an extrusion forming machine, to which a die assembly composed of an extrusion die (i) and a forming die (ii) equipped with a cooling device at an exterior thereof and a passage in communication with a passage of the extrusion die at an interior thereof is coupled;
(2) a step of extruding the resin composition into a desired shape from the extrusion die (i) while melting the resin composition by the extrusion forming machine; and
(3) a step of cooling an extruded product in a molten state extruded from the extrusion die (i) in the interior of the forming die (ii) to solidify the extruded product, thereby obtaining an extruded product having a thickness or diameter exceeding 3 mm.

BEST MODE FOR CARRYING OUT THE INVENTION

1. Thermoplastic Resin

Figure 1:
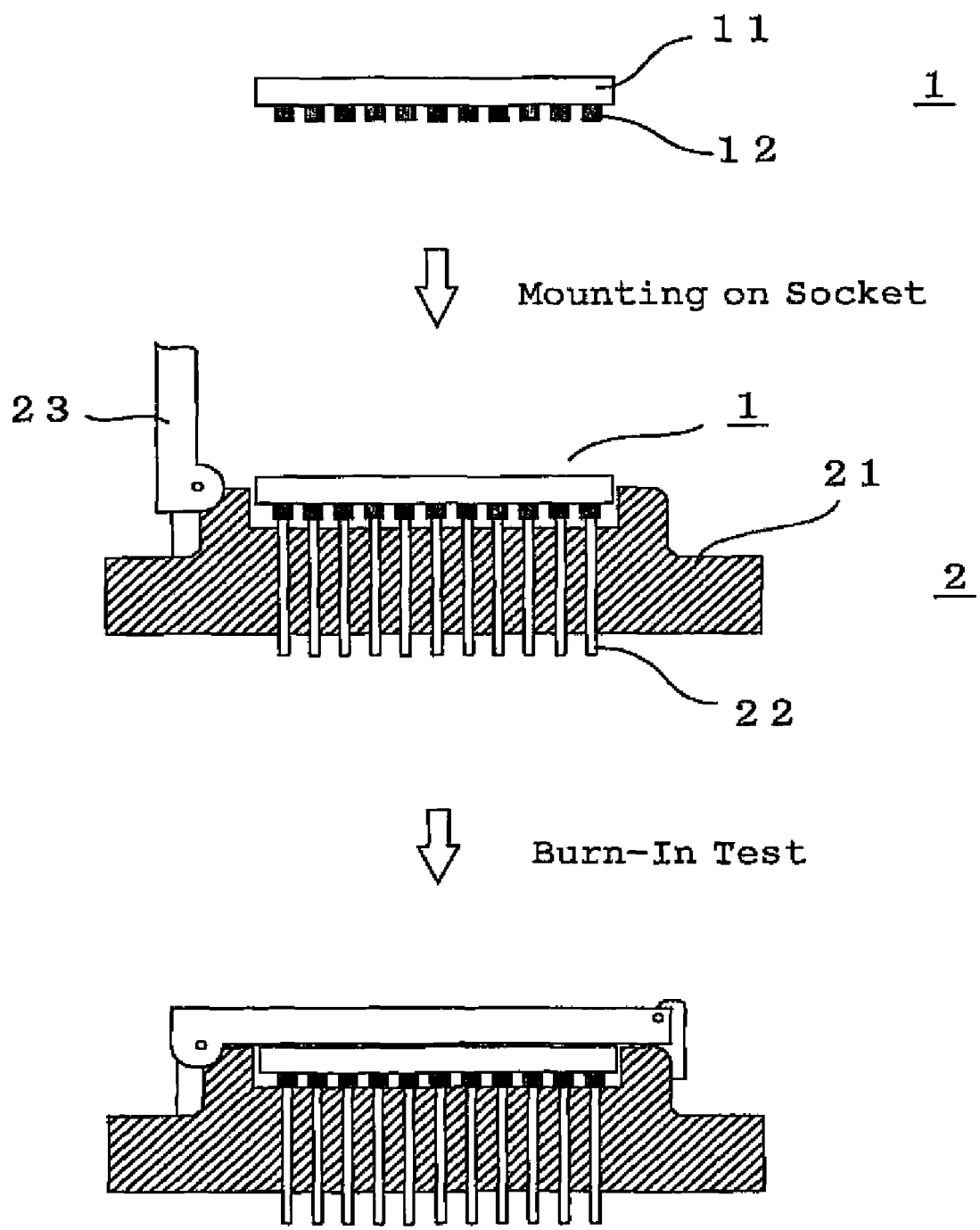
FIG. 1 is a cross-sectional view illustrating a use example of an exemplary IC socket used in a burn-in test.

Examples of the thermoplastic resin used in the present invention include polyamide, polyacetal, thermoplastic polyester resins (for example, polybutylene terephthalate and polyethylene terephthalate), polyolefins (for example, polyethylene, polypropylene, polybutene and polyisobutene), polyisoprene, polyp-xylene), polyvinyl chloride, polyvinylidene chloride, polycarbonate, modified poly(phenylene ether), polyurethane, polydimethylsiloxane, polyvinyl acetate, polystyrene, polymethyl acrylate, polymethyl methacrylate, ABS resins, poly(arylene sulfides) [for example, poly(phenylene sulfide)], poly(ether ether ketone), poly(ether ketone), poly(phenylene sulfide ketone), poly(phenylene sulfide sulfone), poly(ether nitrile), all-aromatic polyester, fluorocarbon resins, polyarylates, polysulfone, poly(ether sulfone), poly(ether imide), polyamide-imide, polyimide, polyaminobismaleimide, diallyl terephthalate resins, and modified products thereof.

Examples of the fluorocarbon resins include tetrafluoroethylene/hexafluoropropylene copolymers; tetrafluoroethylene/perfluoroalkyl vinyl ether copolymers, polychlorotrifluoroethylene, polyvinylidene fluoride, vinylidene fluoride/hexafluoropropylene terpolymers, polyvinyl fluoride, ethylene/tetrafluoroethylene copolymers, ethylene/chlorotrifluoroethylene copolymers, propylene/tetrafluoroethylene copolymers, tetrafluoroethylene/perfluoroalkyl perfluorovinyl ether copolymers, vinylidene fluoride/hexafluoropropylene copolymers, vinylidene fluoride/chlorotrifluoroethylene copolymers, tetrafluoroethylene/ethylene/isobutylene terpolymers, ethylene/hexafluoropropylene copolymers and tetrafluoroethylene/ethyl vinyl ether copolymers.

These thermoplastic resins may be used either singly or in any combination thereof. Among these thermoplastic resins, thermoplastic resins having good heat resistance, whose melting point is at least 220° C., or whose glass transition temperature is at least 170° C., are preferred. The melting point and glass transition temperature are values measured by a differential scanning calorimeter (DSC). The thermoplastic resin used in the present invention is a heat-resistant resin, whereby deformation or discoloration by frictional heat is hard to occur when the resulting extruded product is subjected to machining such as cutting or drilling.

Specific preferable examples of thermoplastic resins having a melting point of at least 220° C. are mentioned together with their melting points (representative values) and include polybutylene terephthalate (224 to 228° C.), polyethylene terephthalate (248 to 260° C.), nylon 6 (220 to 228° C.), nylon 66 (260 to 265° C.), nylon 46 (290° C.), poly(phenylene sulfide) (280 to 295° C.), poly(ether ether ketone) (334° C.), all-aromatic polyester (at least 450° C.), polymethylpentene (235° C.), polytetrafluoroethylene (327° C.), tetrafluoroethylene/hexafluoropropylene/perfluoro-alkoxyvinyl ether terpolymers (290 to 300° C.), tetrafluoroethylene/ethylene copolymers (260 to 270° C.), polyvinyl fluoride (227° C.), tetrafluoro-ethylene/hexafluoropropylene copolymers (253 to 282° C.) and tetrafluoroethylene/perfluoroalkyl vinyl ether copolymers (302 to 310° C.). Many of these thermoplastic resins are crystalline resins.

Specific preferable examples of thermoplastic resins having a glass transition temperature of at least 170° C. are mentioned together with their glass transition temperatures (representative values) and include poly(phenylene ether) (220° C.), polyarylates (193° C.), polysulfone (190° C.), poly(ether sulfone) (225 to 230° C.), poly(ether imide) (217° C.) and polyamide-imide (280 to 285° C.). Many of these thermoplastic resins are amorphous resins.

Thermoplastic polyimide (Tg=250° C.) is a crystalline resin. However, it is amorphous under ordinary forming conditions and crystallized by a heat treatment after forming. On the other hand, polycarbonate is a transparent amorphous resin, but is a heat-resistant resin having a melting point of 246° C.

Among these thermoplastic resins, at least one thermoplastic resin selected from the group consisting of poly(ether ether ketone), poly(ether imide), poly(phenylene sulfide), polysulfone, poly(ether sulfone) and polycarbonate is preferred.

At least two of these thermoplastic resins are preferably used in combination from the viewpoint of inhibiting the production of burr upon drilling. The single use of a resin having high toughness tends to produce burr upon drilling. However, the combined use of two or more thermoplastic resins can markedly inhibit the production of burr. In particular, a resin having high toughness and a resin having relatively low toughness are used in combination, whereby the production of burr can be prevented while retaining high toughness.

When two or more thermoplastic resins are used in combination, the proportions of the resins used are optional. For example, when 2 thermoplastic resins are used in combination, they are preferably used within a range of 5:95 to 95:5, more preferably 10:90 to 90:10 in terms of a mass ratio. When 3 thermoplastic resins are used in combination, they are preferably used within ranges of 5 to 85% by mass, respectively.

As preferable combination of two or more thermoplastic resin, may be mentioned combinations of poly(ether ether ketone) (PEEK)/poly (ether imide) (PEI), poly(ether imide) (PEI)/poly(phenylene sulfide) (PPS), poly(ether ether ketone) (PEEK)/poly (phenylene sulfide) (PPS) and poly (ether ether ketone) (PEEK)/poly(ether imide) (PEI)/poly (phenylene sulfide) (PPS).

When PEI is used, a stock shape for machining, which scarcely produces burr upon drilling, can be provided. In the above-described combinations, particularly desirable proportions of the resins used are described. Proportions of PEEK and PEI used are preferably 40:60 to 95:5, more preferably 50:50 to 90:10, particularly preferably 60:40 to 90:10 in terms of a mass ratio. Likewise, proportions of PPS and PEI used are preferably 40:60 to 95:5, more preferably 50:50 to 90:10, particularly preferably 60:40 to 90:10 in terms of a mass ratio.

Proportions of PEEK and PPS used are within a range of preferably 5:95 to 95:5, more preferably 10:90 to 90:10 in terms of a mass ratio. In order to provide a stock shape or secondarily formed product high in toughness and excellent in machinability, however, it is desirable that the proportions of PEEK and PPS used be controlled to preferably 40:60 to 95:5, more preferably 50:50 to 90:10, particularly preferably 60:40 to 90:10 in terms of a mass ratio. When PEEK, PPS and PEI are used in combination, proportions of the total amount of PEEK and PPS and PEI to be used are preferably 40:60 to 95:5, more preferably 50:50 to 90:10, particularly preferably 60:40 to 90:10 in terms of a mass ratio.

2. Carbon Precursor

The carbon precursor having a volume resistivity within a range of $10^2$ to $10^{10}$ $\Omega \cdot cm$, which is used in the present invention, can be obtained by calcining an organic substance at a temperature of 400 to 900° C. in an inert atmosphere. Such a carbon precursor can be produced, for example, in accordance with (1) a process in which tar or pitch such as petroleum tar, petroleum pitch, coal tar or coal pitch is heated to conduct aromatization and polycondensation, and then oxidized and non-fusibilized in an oxidizing atmosphere as needed, and the resultant product is further heated and calcined in an inert atmosphere, (2) a process in which a thermoplastic resin such as polyacrylonitrile or polyvinyl chloride is non-fusibilized in an oxidizing atmosphere and further heated and calcined in an inert atmosphere, or (3) a process in which a thermosetting resin such as a phenol resin or furan resin is set by heating and then heated and calcined in an inert atmosphere. The carbon precursor means a substance which has a carbon content of at most 97 wt. % and is not completely carbonized.

When an organic substance is heated and calcined in an inert atmosphere, the carbon content in the resulting calcined product increases as the calcining temperature is raised. The carbon content in the carbon precursor can be easily controlled by properly presetting the calcining temperature. The carbon precursor used in the present invention and having a volume resistivity of $10^2$ to $10^{10}$ $\Omega \cdot cm$ may be provided as a carbon precursor which has a carbon content of 80 to 97% by mass and is in a state incompletely carbonized.

If the carbon content in the carbon precursor is too low, the volume resistivity of such a carbon precursor become too high, and it is hence difficult to control the surface resistivity of the resulting stock shape for machining to $10^{13} \Omega/\square$ or lower. The volume resistivity of the carbon precursor used in the present invention is preferably $10^2$ to $10^{10} \Omega \cdot cm$, more preferably $10^3$ to $10^9 \Omega \cdot cm$.

The carbon precursor is generally used in the form of particles or fiber. The average particle diameter of the carbon precursor particles used in the present invention is preferably 1 mm or smaller. If the average particle diameter of the carbon precursor is too great, it is difficult to provide a stock shape having good appearance when formed into a stock shape for machining. The average particle diameter of the carbon precursor is preferably 0.1 μm to 1 mm; more preferably 0.5 to 500 μm, still more preferably 1 to 100 μm. In many cases, the use of the carbon precursor having an average particle diameter of about 5 to 50 μm can yield good results. The average diameter of the carbon precursor fiber used in the present invention is preferably 0.1 mm or small. If the average diameter of the carbon precursor fiber exceeds 0.1 mm, it is difficult to provide a resin part having good appearance when the resulting stock shape for machining is machined. The carbon precursor fiber is preferably short fiber from the viewpoint of dispersibility.

3. Conductive Filler

Examples of the conductive filler having a volume resistivity lower than $10^2$ $\Omega \cdot cm$, which is used in the present invention, include carbon fiber, graphite, conductive carbon black, metallic powder and mixtures thereof. Among these, conductive carbon materials such as carbon fiber, graphite, conductive carbon black and mixtures thereof are preferred from the viewpoints of easy control and reproducibility of the volume resistivity. Such conductive carbon materials are in the form of particles (powder), flake or fiber. Among these, carbon fiber is particularly preferred from the viewpoint of inhibiting burr upon drilling.

No particular limitation is imposed on the carbon fiber used in the present invention. For example, cellulosic, polyacrylonitrile (PAN), lignin or pitch (coal pitch, petroleum pitch or the like) based carbon fiber may be used. These carbon fibers may be used either singly or in any combination thereof. Among these carbon fibers, PAN based carbon fiber, pitch based carbon fiber and mixtures thereof are preferred, with PAN based carbon fiber being particularly preferred.

The average diameter of the carbon fiber is preferably 0.1 mm or small. If the average diameter exceeds 0.1 mm, it is difficult to provide a formed product having good appearance when the resulting stock shape for machining is machined. The average fiber length of the carbon fiber is shorted by shearing force upon its mixing with other components or extrusion. Although the upper limit of the average fiber length of the carbon fiber before mixing is generally about 80 mm, the upper limit of the average fiber length of the carbon fiber in the resulting resin composition after mixing or extrusion is about 1,000 μm. The carbon fiber used in the present invention is preferably short fiber having an average fiber length of at least 20 μm. If carbon fiber having an average fiber length smaller than 20 μm is used, an effect to improve creep characteristics, modulus of elasticity and mechanical properties such as strength is liable to be lessened. It is desirable that the average fiber length of the carbon fiber before mixing be preferably at most 50 mm, more preferably at most 30 mm, particularly preferably at most 10 mm.

No particular limitation is imposed on the conductive carbon black used in the present invention so far as it is conductive. As examples thereof, may be mentioned acetylene black, oil furnace black, thermal black and channel black. These are may be used either singly on in any combination thereof.

No particular limitation is imposed on the graphite used in the present invention, and artificial graphite obtained by subjecting coke, tar, pitch or the like to a graphitizing treatment at a high temperature, or natural graphite such as lepidoblastic graphite, flake graphite or earthy graphite may be used.

The volume resistivity of the conductive filler used in the present invention is lower than $10^2$ Ω·cm, and the lower limit thereof is generally a volume resistivity of a metallic material such as metallic powder or metallic fiber.

4. Other Additives

Into the resin composition making up the stock shape for machining according to the present invention, may be incorporated various fillers for the purpose of improving mechanical strength and heat resistance. Examples of the fillers include fibrous fillers, such as inorganic fibrous materials such as glass fiber, carbon fiber, asbestos fiber, silica fiber, alumina fiber, zirconia fiber, boron nitride fiber, silicon nitride fiber, boron fiber and potassium titanate fiber; metallic fibrous materials such as stainless steel, aluminum, titanium, steel and brass; and high-melting organic fibrous materials such as polyamide, fluorocarbon resins, polyester resins and acrylic resins.

As other examples of the fillers, may be mentioned particulate or powdered fillers such as mica, silica, talc, alumina, kaolin, calcium sulfate, calcium carbonate, titanium oxide, ferrite, clay, glass powder, zinc oxide, nickel carbonate, iron oxide, quartz powder, magnesium carbonate and barium sulfate.

These fillers may be use either singly or in any combination thereof. The fillers may be treated with greige goods or surface-treating agents as needed. Examples of the greige goods or surface-treating agents include functional compounds such as epoxy compounds, isocyanate compounds, silane compounds and titanate compounds. These compounds may be used for conducting a surface treatment or collecting treatment for the fillers in advance or added at the same time as the fillers upon the preparation of the resin composition.

To the resin composition making up the stock shape for machining according to the present invention, may be suitably added, as other additives than those described above, for examples, impact modifiers such as epoxy group-containing α-olefin copolymers, resin-modifying agents such as ethyleneglycidyl methacrylate, corrosion inhibitors for die such as zinc carbonate and nickel carbonate, lubricants such as pentaerythritol tetrastearate, thermosetting resins, antioxidants, ultraviolet absorbents, nucleating agents such as boron nitride, flame retardants, and colorants such as dyes and pigments.

5. Resin Composition

The resin composition making up the stock shape for machining according to the present invention is a resin composition comprising 30 to 94% by mass of a thermoplastic resin (A), 5 to 40% by mass of a carbon precursor (B) having a volume resistivity of $10^2$ to $10^{10}$ Ω·cm and 1 to 30% by mass of a conductive filler (C) having a volume resistivity lower than $10^2$ Ω·cm. Other additive components may be suitably incorporated in proper amounts as needed.

The proportion of the thermoplastic resin (A) incorporated is within a range of 30 to 94% by mass, preferably 50 to 90% by mass, more preferably 60 to 85% by mass. If the proportion of the thermoplastic resin incorporated is too high, the surface resistivity of the resulting stock shape for machining becomes too high, and so it is difficult to provide a stock shape for machining and a formed product having a desired surface resistivity within the semiconductive region. If the proportion of the thermoplastic resin incorporated is too low, the volume resistivity of the resulting stock shape for machining becomes too low, and so it is difficult to provide a stock shape for machining and a formed product having a desired surface resistivity within the semiconductive region. The proportion of the thermoplastic resin (A) incorporated is preferably relatively high within the above-described range from the viewpoint of conducting machining such as cutting and drilling. As described above, burr is easily produced upon machining when a thermoplastic resin having high toughness. However, two or more thermoplastic resins different in toughness are used in combination, whereby the machinability of the resulting stock shape for machining can be greatly improved while retaining high toughness.

The proportion of the carbon precursor (B) incorporated is within a range of 5 to 40% by mass, preferably 8 to 30% by mass, more preferably 12 to 25% by mass. The carbon precursor and the conductive filler are incorporated in combination into the thermoplastic resin, whereby the surface resistivity of the resulting stock shape for machining can be strictly controlled to the desired value within the semiconductive range compared with the case where the conductive filler is incorporated by itself, and even a scatter of surface resistivity with the locality can be lessened.

If the proportion of the carbon precursor incorporated is too high, the mechanical properties of the resulting stock shape for machining is deteriorated, so that inconvenience may be caused in some cases upon machining. If the proportion of the carbon precursor incorporated is too low, it is difficult to sufficiently lower the surface resistivities of the resulting stock shape for machining and formed product or to strictly control the surface resistivity within the range of $10^5$ to $10^{13}$ Ω/□.

The proportion of the conductive filler (C) incorporated is within a range of 1 to 30% by mass, preferably 2 to 20% by mass, more preferably 3 to 15% by mass. If the proportion of the conductive filler incorporated is too high, the surface resistivities of the resulting stock shape for machining and formed product become too low, or it is difficult to precisely control the surface resistivities to the desired values within the semiconductive region. If the proportion of the conductive filler incorporated is too low, it is difficult to sufficiently lower the surface resistivities of the resulting stock shape for machining and formed product or to control the surface resistivities to the desired values within the semiconductive region.

The resin composition used in the present invention can be prepared by equipments and processes generally used in the preparation of thermoplastic resin compositions. For example, individual raw components may be premixed in a Henschel mixer, tumbler or the like, fillers such as glass fiber may be added to the premix, if necessary, to further mix their components, and the resultant mixture may be then kneaded and extruded by means of a single-screw or twin-screw extruder into pellets for forming.

There may also be used a process in which part of the necessary components are provided as a masterbatch upon the preparation of pellets or forming by extrusion, and the masterbatch is then mixed with the remaining components, or a process in which part of raw materials used are ground to make the particle sizes of the components uniform for the purpose of enhancing the dispersibility of the individual components, and such components are then mixed.

6. Stock Shape for Machining

The stock shape for machining according to the present invention can be formed by extrusion. An extrusion and solidification method may be preferably adopted as an extrusion method. In the extrusion and solidification, an extrusion forming machine, to the tip of which an extrusion die and a forming die are coupled, is used. The extrusion die is a die for forming a molten resin melt-kneaded and extruded by the extrusion forming machine into a desired shape, and a die of any of various opening forms or structures, such as a flat plate-forming die, round bar-forming die or pipe-forming die, is used according to the sectional form of an extruded product to be formed, such as a plate, round bar, pipe or special shape.

A forming die is coupled to the extrusion die. The forming die is a die having a structure that a cooling device and a passage in communication with a passage of the extrusion die are respectively provided at an exterior and an interior thereof. The extruded product in the molten state extruded from the extrusion die is led to the forming die and cooled and solidified in the interior thereof. Accordingly, the extruded product extruded from the forming die is extruded in the solidified state to the outside. A specific example of the extrusion forming machine suitable for such extrusion and solidification is disclosed in, for example, Japanese Patent Application Laid-Open No. 61-185428.

According to the results of an investigation by the present inventors, it has been found that an extruded product, which is suitable for machining such as cutting, drilling and shearing, thick-wall and low in residual stress, is obtained by extruding and solidifying the above-described resin composition. More specifically, a feature of the process for producing a stock shape for machining according to the present invention resides in that an extruded product having a thickness or diameter exceeding 3 mm is obtained by extruding and solidifying the above-described resin composition through the following Steps 1 to 3:

(1) a step of feeding the resin composition to an extrusion forming machine, to which a die assembly composed of an extrusion die and a forming die equipped with a cooling device at an exterior thereof and a passage in communication with a passage of the extrusion die at an interior thereof is coupled;
(2) a step of extruding the resin composition into a desired shape from the extrusion die while melting the resin composition by the extrusion forming machine; and
(3) a step of cooling an extruded product in a molten state extruded from the extrusion die in the interior of the forming die to solidify the extruded product.

After the extrusion and solidification, it is desirable that the solidified extruded product be subjected to a heat treatment for at least 30 minutes at a temperature of from 150° C. to a temperature capable of retaining the solidified state for the purpose of removing residual stress and not causing inconvenience such as deformation of the stock shape and a secondarily formed product after the machining. With respect to the conditions of the heat treatment, it is desirable that when a heat-resistant resin is used, the heat treatment temperature be within a range of preferably 170 to 310° C., more preferably 180 to 300° C., and the heat treatment time be preferably at least 1 hour, more preferably at least 2 hours, particularly preferably at least 3 hours though they vary according to the thermal properties of the thermoplastic resin used, such as melting point and glass transition temperature. However, the upper limit of the heat treatment temperature is up to a temperature at which the solidified state of the extruded product can be retained, and it is desirable that such a high temperature that the thermoplastic resin (including a mixture of 2 or more resins) is melted and deformed be avoided. The heat treatment time is preferably longer. It is however desirable that the time be generally within 24 hours, preferably within 15 hours from the viewpoint of productivity. The heat treatment can be conducted by, for example, leaving the extruded product to stand in a heating oven.

The stock shape for machining according to the present invention is an extruded product obtained by extruding the resin composition and having a thickness or diameter exceeding 3 mm. A plate (flat plate), round bar, pipe or special shape is representative of the form of the stock shape for machining.

When the stock shape for machining is in the form of a plate, it is necessary for the thickness thereof to exceed 3 mm. When the stock shape for machining is in the form of a round bar, the diameter thereof exceeds 3 mm. When the stock shape for machining is in the form of a pipe, the wall thickness thereof exceeds 3 mm. When the stock shape for machining is in the form of a special shape, the wall thickness of a portion of the greatest thickness exceeds 3 mm. The special shape is an extruded product having any other sectional form than the plate, round bar and pipe. When the special shape is made up of thick-wall portions and thin-wall portions, such as concave portions and convex portions, it is desirable that the thickness of the thinnest-wall portion exceeds 3 mm from the viewpoint of suitability for machining Since the stock shape for machining according to the present invention is subjected to cutting and drilling by substantially the same processing methods as in machining of a metallic material, it is difficult to machine the stock shape if the thickness or diameter thereof is too small. For example, an extruded product obtained by an ordinary extrusion, such as a film, sheet or tube, is generally small in stiffness, thin in thickness and flexible, and so it is difficult or substantially impossible to subject such an extruded product to cutting or drilling by a drill or the like. In addition, the extruded product having a too thin thickness is difficult to be provided by extrusion and solidification method. The upper limit of the thickness or diameter is generally about 100 mm. If the thickness or diameter is too great, it is difficult to sufficiently remove or reduce residual stress even when such an extruded product is heat-treated. If an extruded product great in residual stress is machined, the resulting secondarily formed product tends to cause deformation.

The stock shape for machining according to the present invention is preferably a plate or round bar, and a plate is more preferred when it is applied to the above-described rein part. The thickness of the plate is preferably greater than 3 mm, but smaller than 100, more preferably from 4 mm to 70 mm, particularly preferably from 5 mm to 50 mm. The same applies to the diameter of the round bar. A plate obtained by extruding and solidifying the resin composition according to the present invention and having a thickness exceeding 3 mm is a plate strong in stiffness and can be easily subjected to machining such as cutting, drilling and shearing.

7. Machining

Cutting, drilling, shearing and combinations thereof are representative of the machining. Cutting methods may widely include drilling in some cases in addition to cutting. The cutting methods include turning, grinding, lathing and boring making use of a single cutter. Cutting methods making use of a multi-cutter include milling, drilling, thread cutting, gear cutting, diesinking and filing. In the present invention, drilling making use of a drill or the like may be distinguished from the cutting in some cases. Shearing methods include shearing by a cutting tool (saw), shearing by abrasive grains and shearing by heating and melting. Besides, ground finishing methods, plastic working methods such as punching making use of a knife-like tool and marking-off shearing, special working methods such as laser beam machining, etc. may also be applied.

When the stock shape for machining is a plate or round bar having a great wall thickness, the stock shape is generally shorn into a proper size or thickness, the shorn stock shape is ground to order its shape to a desired form, and necessary portions of the stock shape thus machined are further subjected to drilling as needed. The stock shape is finally subjected to a finishing operation. However, the order of the machining is not limited to this order. When a smooth surface is hard to form by melting of the stock shape for machining due to frictional heat upon the machining, the machining is desirably conducted while cooling a cutting surface or the like. When the stock shape for machining is heated in excess by the frictional heat, the cause of deformation and discoloration is formed. It is hence preferable to control the temperature of the stock shape or surface to be machined to a temperature of 200° C. or lower.

The stock shape for machining according to the present invention is subjected to machining such as cutting, drilling and shearing, whereby various secondarily formed products such as resin parts can be obtained. Its specific uses include wafer carriers, wafer cassettes, spin chucks, tote bottles, wafer boards, IC chip trays, IC chip carriers, IC conveying tubes, IC test sockets, burn-in sockets, pin grid array sockets, quad flat packages, leadless chips carriers, dual in-line packages, small outline packages, reel packings, various cases, storage trays, parts for conveying apparatus, magnetic card readers, and the like in electric and electronic fields.

In a field OA instruments, the uses include charging members such as charging rolls, transfer rolls and developing rolls in image forming apparatus such as electrophotographic copying machines and electrostatic recording apparatus, transfer drums for recording apparatus, printed circuit board cassettes, bushings, paper and paper money conveying parts, paper feed rails, font cartridges, ink ribbon canisters, guide pins, trays, rollers, gears, sprockets, housings for connectors, modem housings, monitor housings, CD-ROM housings, printer housings, connectors, computer sprockets, and the like.

In a field of communication apparatus, the uses include portable telephone parts, pagers, various kinds of lubricating materials, and the like. In a field of automobiles, the uses include interiors, underhoods, electronic and electric instrument housings, gas tank caps, fuel filters, fuel line connectors, fuel line clips, fuel reservoirs or tanks, instrument bezels, door handles, other various parts, and the like. In other fields than those described above, the used includes wire and wire supporters, electromagnetic wave absorbers, floor coverings, pallet, shoe soles, brushes, blower fans, flat heaters, polyswitches, and the like.

The surface resistivity of the stock shape for machining according to the present invention can be exactly controlled to a desired value within a range of $10^5$ to $10^{13}$ Ω/□. The surface resistivity of a secondarily formed product obtained by the machining can also retain a value of the same level. Therefore, the stock shape for machining according to the present invention is suitable for forming of various kinds of resin parts used in electric and electronic equipments such as semiconductor devices and display equipments such as liquid crystal display devices.

As an example of such a resin part, maybe mentioned an IC socket used in a burn-in test for semiconductor devices. FIG. 1 is a cross-sectional view of an exemplary IC socket for measurement. A bare chip 1 equipped with a bare chip body 1 and bumps 12 is placed on a mount table of the IC socket 2. The IC socket 2 is made up of a socket body 21, contact probe pins 22, a lid body 23 and the like. As the pins 22, are used, for example, flexible pins or insert pins. They can be brought into contact with terminals such as bumps to conduct to one another. The lid body 23 is closed to perform a burn-in test. Bare chips judged to be non-defective after completion of the burn-in test are multichip-mounted on a board.

Figure 2:
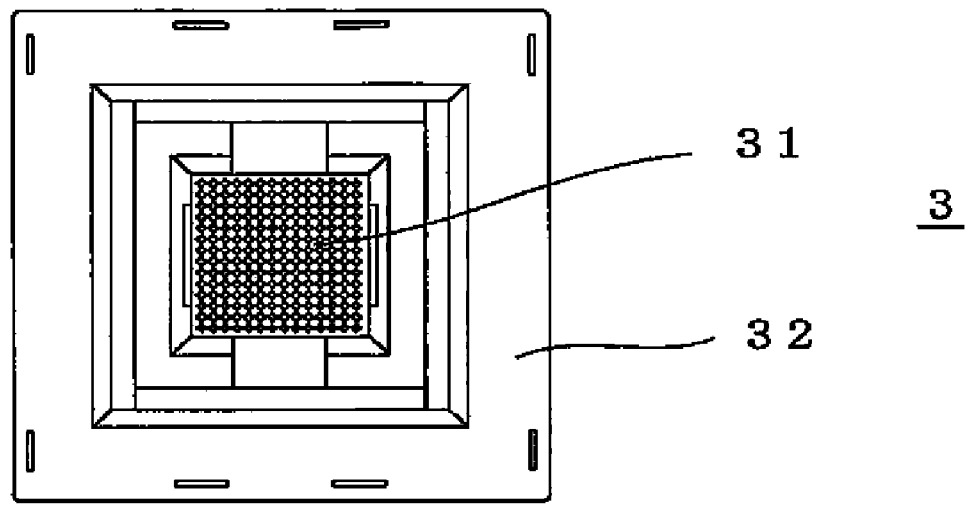
FIG. 2 is a top view illustrating an exemplary open top type IC socket for burn-in test.
Figure 3:
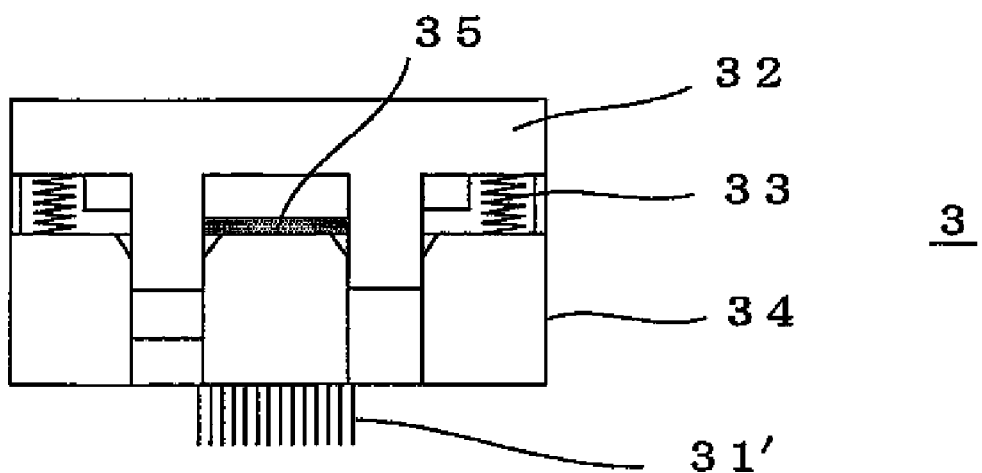
FIG. 3 is a cross-sectional view of a side of the IC socket shown in FIG. 2.

FIG. 2 is a top view illustrating an exemplary burn-in socket for fine ball grid array (FBGA) package. FIG. 3 is a cross-sectional view of this socket. The socket 3 is made up of contact pins 31 arranged at a fixed arrangement pitch, a lid body 32, springs 33, a body (bottom) 34 and the like. In FIG. 3, pins 31' on a side conducted to a test apparatus are illustrated. An FBGA package 35 is placed on a mount table so as to come into contact with the pins 31. The form, pitch, number and the like of the pins 31 are designed so as to enable them to come into contact with a great number of spherical terminals of the FBGA.

The IC socket is required to be excellent in electrical insulating properties, dielectric strength, mechanical properties, heat resistance, chemical resistance, dimensional stability and the like. The IC socket is formed from a ceramic or a metal subjected to an insulating treatment on its surface. In many cases, it is formed from a synthetic resin. The IC socket made from the synthetic resin is generally produced by injection molding. However, it is desirable to produce IC sockets by machining using the synthetic resin for coping with changes in specification, diversified small-quantity production, complicated structure and refinement of the structure of the IC sockets.

The stock shape for machining according to the present invention is suitable for production of resin parts such as IC sockets. In order to produce, for example, an IC socket body by the machining, the stock shape for machining is shorn into a proper size, the whole shape thereof is ordered by cutting, contact pin-inserting holes are formed by drilling. Other resin parts may also be produced by similar processes.

EXAMPLES

The present invention will hereinafter be described more specifically by the following Examples and Comparative Examples. Physical properties and characteristics or properties in the examples were measured or determined in accordance with the following respective methods.

(1) Surface Resistivity

The surface resistivity (Ω/□) of a sample was measured under applied voltage of 100 V using a Hiresta UP (manufactured by Mitsubishi Chemical Corporation) and a probe (diameter of guard electrode: 10 mm; UR-SS probe) for micro samples. The measurement of the surface resistivity was performed at optional 5 points of each of stock shape and secondarily formed product (IC socket) samples to measure the maximum (MAX) and minimum (MIN) values thereof. With respect to a flat plate for measurement, an average value was shown.

The surface resistivity of the sample indicates a resistance per unit surface area. The unit of the surface resistivity is Ω. However, the surface resistivity is represented by Ω/□ or Ω/sq. (ohm per square) for distinguishing it from a mere resistance.

(2) Volume Resistivity:

The volume resistivity of each sample was measured under applied voltage of 100 V in accordance with JIS K-6911 when the volume resistivity was at least $10^8$ Ω·cm. When the volume resistivity was lower than 108 Ω·cm, it was measured in accordance with JIS K-7194 (Testing method for resistivity of conductive plastics by a four-point probe method).

(3) Amount of Burr Produced

A flat plate sample having a thickness of 10 mm was subjected to drilling under conditions that a drill having a drill diameter of 800 μm was used, the number of revolutions of the drill was 8,000 revolutions/min, and the feed speed of the drill was 200 mm/min, and the length of burr produced around a hole was evaluated through an electron microscope. With respect to evaluation standard, the plate sample was ranked as A where the length of the burr observed was shorter than 5

µm, B where the length was not shorter than 5 µm, but not longer than 30 µm, or C where the length was longer than 30 µm.

Preparation Example 1

Preparation of Carbon Precursor

A pressure container having an internal volume of 300 L and equipped with a stirring blade was charged with 68 kg of petroleum pitch having a softening point of 210° C., a quinoline-insoluble matter content of 1% by mass and an H/C atomic ratio of 0.63 and 32 kg of naphthalene, and the contents were heated to 190° C. to melt and mix them. The resultant melt was then cooled to 80 to 90° C. and extruded to obtain a string-like formed product having a diameter of about 500 µm.

The string-like formed product was then ground so as to give a ratio of diameter to length of about 1.5, and the resultant ground product was poured into a 0.53% by mass aqueous solution of polyvinyl alcohol (saponification degree: 88%) heated to 93° C. and dispersed therein under stirring. The resultant dispersion was then cooled to obtain spherical formed pitch. The spherical formed pitch was additionally subjected to filtration to remove water, and naphthalene in the spherical formed pitch was extracted out with n-hexane about 6 times as much as the formed pitch.

The spherical formed pitch obtained in such a manner was held at 260° C. for 1 hour while introducing hot air, thereby conducting an oxidizing treatment to obtain oxidized pitch. This oxidized pitch was heat-treated at 580° C. for 1 hour under a nitrogen atmosphere and then ground to obtain particles of a carbon precursor having an average particle diameter of about 25 µm. The carbon content in the carbon precursor particles thus obtained was 91.0% by mass.

In order to determine the volume resistivity of the carbon precursor, a sample for measurement was prepared in accordance with the following process. The oxidized pitch was ground, and particles having a diameter of 100 µm or greater was then sifted out by means of a mesh having an opening of about 100 µm. Thirteen grams of the thus-obtained ground oxidized pitch were charged into a cylindrical mold having a sectional area of 80 cm$^2$ to mold it under a pressure of 196 MPa, thereby obtaining a molded product. This molded product was heat-treated under a nitrogen atmosphere for 1 hour at 580° C. that is the same temperature as the heat-treating temperature in the preparation process of the carbon precursor particles, thereby obtaining a sample for volume resistivity measurement of the carbon precursor. The volume resistivity of this sample was measured in accordance with JIS K-7194. As a result, it was $3 \times 10^7$ Ω·cm.

Example 1

Their corresponding components shown in Table 1 were uniformly dry-blended in a tumbler mixer, and the dry blend thus obtained was fed to a twin-screw kneader extruder (PCM-45, manufactured by Ikegai Corp.) having a barrel diameter of 45 mm and melted and extruded, thereby preparing pellets. The pellets thus obtained were dried and then fed to a single-screw extrusion forming machine, to which a die assembly composed of an extrusion die for formation of a flat plate and a forming die equipped with a cooling device at an exterior thereof and a passage in communication with a passage of the extrusion die at an interior thereof was coupled to form a flat plate having a width of 520 mm and a thickness of 10 mm by the extrusion and solidification method. The flat plate obtained by the extrusion was heat-treated for 8 hours at its corresponding heat-treating temperature shown in Table 1, thereby removing residual stress.

A surface resistivity was measured by means of the flat plate obtained in such a manner. In addition, the flat plate was subjected to drilling to evaluate it as to the amount of burr produced. Further, this flat plate was subjected to shearing, cutting and drilling to produce a burn-in socket body (FIGS. 2 and 3) for FBGA package having a length of 33 mm and a breadth of 33 mm, thereby measuring its surface resistivity. The results are shown in Table 1.

Examples 2 to 10 and Comparative Examples 1 to 4

Respective flat plates were formed by the extrusion and solidification method in the same manner as in Example 1 except that the respective components were changed as shown in Table 1, and the flat plates were subjected to drilling and machining to produce socket bodies to evaluate them as to the amount of burr produced and surface resistivity. The results are shown in Table 1.

TABLE 1

| | | Unit | Example | | | | | | | | | |
|---|---|---|---|---|---|---|---|---|---|---|---|---|
| | | | 1 | 2 | 3 | 4 | 5 | 6 | 7 | 8 | 9 | 10 |
| PEEK | | % by mass | 80 | 77 | 75 | 69 | 49 | 0 | 0 | 0 | 0 | 65 |
| PEI | | % by mass | 0 | 0 | 0 | 10 | 30 | 79 | 67 | 0 | 20 | 0 |
| PPS | | % by mass | 0 | 0 | 0 | 0 | 0 | 0 | 0 | 72 | 52 | 15 |
| Carbon precursor | | % by mass | 16 | 16 | 16 | 16 | 16 | 16 | 20 | 22 | 22 | 15 |
| Carbon fiber PAN HTA300 | | % by mass | 4 | 0 | 9 | 5 | 5 | 5 | 13 | 6 | 6 | 5 |
| Carbon fiber PAN MLD30 | | % by mass | 0 | 7 | 0 | 0 | 0 | 0 | 0 | 0 | 0 | 0 |
| Carbon black | | % by mass | 0 | 0 | 0 | 0 | 0 | 0 | 0 | 0 | 0 | 0 |
| Heat treating temperature | | °C. | 270 | 270 | 270 | 270 | 270 | 200 | 200 | 260 | 260 | 268 |
| Flat plate | Surface resistivity | Ω/□ | 5E+11 | 2E+11 | 3E+09 | 4E+11 | 3E+11 | 4E+10 | 1E+07 | 2E+08 | 8E+08 | 5E+10 |
| | Minimum surface resistivity (MIN) | Ω/□ | 2E+11 | 1E+11 | 1E+09 | 1E+11 | 9E+10 | 1E+10 | 3E+06 | 1E+07 | 1E+08 | 2E+10 |
| | Maximum surface resistivity (MAX) | Ω/□ | 7E+11 | 5E+11 | 5E+09 | 6E+11 | 5E+11 | 8E+10 | 3E+07 | 4E+08 | 2E+09 | 7E+10 |
| Socket | Minimum surface resistivity (MIN) | Ω/□ | 5E+10 | 5E+10 | 3E+08 | 3E+10 | 2E+10 | 5E+09 | 9E+05 | 8E+06 | 1E+07 | 7E+09 |
| | Maximum surface resistivity (MAX) | Ω/□ | 4E+11 | 2E+11 | 2E+09 | 3E+11 | 8E+11 | 6E+10 | 5E+07 | 1E+08 | 8E+08 | 1E+11 |
| Amount of burr produced upon drilling | | | B | B | B | A | A | A | A | B | A | A |

TABLE 1-continued

|  | Unit | Comparative Example | | | |
|---|---|---|---|---|---|
|  |  | 1 | 2 | 3 | 4 |
| PEEK | % by mass | 73 | 76 | 0 | 0 |
| PEI | % by mass | 0 | 0 | 80 | 0 |
| PPS | % by mass | 0 | 0 | 0 | 96 |
| Carbon precursor | % by mass | 0 | 0 | 0 | 0 |
| Carbon fiber PAN HTA300 | % by mass | 0 | 0 | 20 | 0 |
| Carbon fiber PAN MLD30 | % by mass | 27 | 24 | 0 | 0 |
| Carbon black | % by mass | 0 | 0 | 0 | 4 |
| Heat treating temperature | ° C. | 270 | 270 | 200 | 260 |
| Flat plate — Surface resistivity | Ω/□ | Unstable | >1E+13 | Unstable | Unstable |
| Flat plate — Minimum surface resistivity (MIN) | Ω/□ | 2E+04 | >1E+13 | 3E+03 | 5E+06 |
| Flat plate — Maximum surface resistivity (MAX) | Ω/□ | >1E+13 | >1E+13 | 1E+09 | 8E+10 |
| Socket — Minimum surface resistivity (MIN) | Ω/□ | <1E+6 | >1E+13 | <1E+06 | 3E+06 |
| Socket — Maximum surface resistivity (MAX) | Ω/□ | >1E+13 | >1E+13 | >1E+13 | 1E+11 |
| Amount of burr produced upon drilling |  | B | B | A | C |

(Note)
(1) PEEK [poly(ether ether ketone)]: product of Victrex-MC, Inc., trade name "PEEK450P", melting point = 334° C.
(2) PEI [poly(ether imide)]: product of GE Plastics Co., trade name "ULTEM 1010", glass transition temperature Tg = 217° C.
(3) PPS [poly(phenylene sulfide)]: product of Kureha Chemical Industry Co., Ltd., trade name "FORTRON KPS W214, melting point = 288° C.
(4) PAN based carbon fiber: product of Toho Rayon Co., Ltd., trade name "Besfight HTA 3000", volume resistivity = lower than $10\ \Omega \cdot cm$.
(5) PAN based carbon fiber: product of Toray Industries Inc., trade name "TORAYCA MLD30", volume resistivity = lower than $10^2\ \Omega \cdot cm$.
(6) Carbon black: conductive carbon black, product of Lion Corporation, trade name "Ketjen Black EC600JD", volume resistivity = lower than $10^2\ \Omega \cdot cm$.
(7) Surface resistivity: $\alpha \times 10^\beta$ Ω/□ was indicated by "αE + β". For example, when the surface resistivity is $5 \times 10^{11}$ Ω/□, it was indicated by 5E+11.

Consideration:

(1) Example 1

Products Having a Surface Resistivity of the 11th Power

Both flat plate obtained by the extrusion and solidification of the resin composition obtained by incorporating the carbon precursor and PAN based carbon fiber into PEEK, and socket body obtained by machining the flat plate have a surface resistivity at E+11Ω/□ level and exhibit stable surface resistivity.

(2) Example 2

Products Having a Surface Resistivity of the 11th Power with the Carbon Fiber Changed to MLD CF Both flat plate obtained by the extrusion and solidification of the resin composition obtained by incorporating the carbon precursor and PAN based carbon fiber (MLD carbon fiber) into PEEK, and socket body obtained by machining the flat plate have a surface resistivity at E+10 to E+11Ω/□ level and exhibit stable surface resistivity.

(3) Example 3

Products Having a Surface Resistivity of the 9th Power

Both flat plate obtained by the extrusion and solidification of the resin composition obtained by incorporating the carbon precursor and PAN based carbon fiber into PEEK, and socket body obtained by machining the flat plate have a surface resistivity at E+8 to E+9Ω/□ level and exhibit stable surface resistivity.

(4) Examples 4 and 5

Reduction of the Amount of Burr Produced Upon Drilling

When PEEK and PEI are used in combination as thermoplastic resins, the amount of burr produced upon drilling can be markedly reduced. Both flat plate obtained by the extrusion and. solidification of the resin composition and socket body obtained by machining the flat plate have a surface resistivity at E+10 to E+11Ω/□ level and exhibit stable surface resistivity.

(5) Example 6

Products Having a Surface Resistivity of the 10th Power

Both flat plate obtained by the extrusion and solidification of the resin composition obtained by incorporating the carbon precursor and PAN based carbon fiber into PEI, and socket body obtained by machining the flat plate have a surface resistivity at E+9 to E+10Ω/□ level and exhibit stable surface resistivity. The effect to reduce the production of burr is also good.

(6) Example 7

Products Having a Surface Resistivity of the 6th to 7th Power

Both flat plate obtained by the extrusion and solidification of the resin composition obtained by incorporating the carbon precursor and PAN based carbon fiber into PEI, and socket body obtained by machining the flat plate have a surface resistivity at E+6 to E+7Ω/□ level and exhibit stable surface resistivity. The effect to reduce the production of burr is also good.

(7) Example 8

Products Having a Surface Resistivity of the 7th to 8th Power

Both flat plate obtained by the extrusion and solidification of the resin composition obtained by incorporating the carbon precursor and PAN based carbon fiber into PPS, and socket body obtained by machining the flat plate have a surface resistivity at E+7 to E+8Ω/□ level and exhibit stable surface resistivity. The effect to reduce the production of burr is also good.

(8) Example 9

Reduction of the Amount of Burr Produced Upon Drilling

When PEI and PPS are used in combination as thermoplastic resins, the amount of burr produced upon drilling can be markedly reduced. Both flat plate obtained by the extrusion and solidification of the resin composition and socket body obtained by machining the flat plate exhibit stable surface resistivity.

(9) Example 10

Reduction of the Amount of Burr Produced Upon Drilling

When PEEK and PPS are used in combination as thermoplastic resins, the amount of burr produced upon drilling can be markedly reduced. Both flat plate obtained by the extrusion and solidification of the resin composition and socket body obtained by machining the flat plate exhibit stable surface resistivity.

(10) Comparative Example 1

Both flat plate obtained by the extrusion and solidification of the resin composition obtained by incorporating the PAN based carbon fiber (MLD carbon fiber) into PEEK and socket body obtained by machining the flat plate exhibit unstable surface resistivity.

(11) Comparative Example 2

Both flat plate obtained by the extrusion and solidification of the resin composition obtained by incorporating the PAN based carbon fiber (MLD carbon fiber) into PEEK and socket body obtained by machining the flat plate become too high in surface resistivity.

(12) Comparative Example 3

Both flat plate obtained by the extrusion and solidification of the resin composition obtained by incorporating the PAN based carbon fiber into PEI and socket body obtained by machining the flat plate are wide in a scatter of surface resistivity and exhibit unstable surface resistivity.

(13) Comparative Example 4

Both flat plate obtained by the extrusion and solidification of the resin composition obtained by incorporating the conductive carbon black into PPS and socket body obtained by machining the flat plate are wide in a scatter of surface resistivity and exhibit unstable surface resistivity.

INDUSTRIAL APPLICABILITY

According to the present invention, there can be provided stock shapes for machining, which can be formed into parts having a thickness exceeding 3 mm, particularly not smaller than 5 mm, are strictly controlled to a surface resistivity within a semiconductive region, excellent in mechanical properties, heat resistance, chemical resistance and dimensional stability and also excellent in machinability and can be inhibited from producing burr upon drilling.

The stock shapes for machining according to the present invention are high in machining accuracy and suitable for forming of various resin parts such as electric and electronic equipment parts and display equipment parts.

The invention claimed is:

1. A secondarily formed product obtained by machining an extruded stock shape for machining, the extruded stock shape comprising an extruded plate having a thickness of 10 to 50 mm or an extruded round bar having a diameter of 10 to 50 mm, wherein
   (i) the extruded stock shape is produced by an extrusion and solidification method using an extrusion forming machine, to the tip of which an extrusion die and a forming die are coupled, wherein the forming die includes a cooling device at its exterior and is provided at its interior with a passage in communication with a passage of the extrusion die;
   (ii) the extruded stock shape has a surface resistivity of $10^5$ to $10^{13} \Omega/\square$;
   (iii) the extruded stock shape is free of residual stress, wherein residual stress is stress which is relieved by heat treatment of the shape, within 15 hours of extrusion and solidification of the extruded stock shape, for at least 3 hours at a temperature of from 180° C. to a temperature at which the extruded shape is maintained in a solidified state after extrusion and solidification;
   (iv) the extruded stock shape is formed of a resin composition comprising
   30 to 94% by mass of a thermoplastic resin (A) having a melting point of at least 220° C. or a glass transition temperature of at least 170° C., wherein the thermoplastic resin is a mixture composed of at least two thermoplastic resins selected from the group consisting of poly(ether ether ketone), poly(ether imide), poly(phenylene sulfide), polysulfone, poly(ether sulfone), and polycarbonate,
   5 to 40% by mass of a carbon precursor (B) having a volume resistivity of $10^2$ to $10^{10}$ Ω·cm and a carbon content of 80 to 97% by mass, and
   1 to 30% by mass of a conductive carbon fiber (C) having a volume resistivity lower than $10^2$ Ω·cm; and
   (v) the extruded stock shape is drillable such that in a flat plate sample of the extruded shape having a thickness of 10 mm drilled with a drill diameter of 800 μm, at 8,000 revolutions/min and a feed speed of 200 mm/min, a burr around a drilled hole has a length of not longer than 30 μm as observed with an electron microscope.

2. The secondarily formed product according to claim 1, wherein the mixture of at least two thermoplastic resins is a mixture composed of a combination of poly(ether ether ketone)/poly(ether imide), poly(ether imide)/poly(phenylene sulfide), poly(ether ether ketone)/poly(phenylene sulfide), or poly(ether ether ketone)/poly(ether imide)/poly(phenylene sulfide).

3. The secondarily formed product according to claim 2, wherein the mixture of at least two thermoplastic resins is a mixture containing poly(ether ether ketone) and poly(ether imide) in proportions of 40:60 to 95:5 in terms of a mass ratio.

4. The secondarily formed product according to claim 2, wherein the mixture of at least two thermoplastic resins is a mixture containing poly(phenylene sulfide) and poly(ether imide) in proportions of 40:60 to 95:5 in terms of a mass ratio.

5. The secondarily formed product according to claim 2, wherein the mixture of at least two thermoplastic resins is a mixture containing poly(ether ether ketone) and poly(phenylene sulfide) in proportions of 40:60 to 95:5 in terms of a mass ratio.

6. The secondarily formed product according to claim 2, wherein the mixture of at least two thermoplastic resins is a mixture containing poly(ether ether ketone), poly(phenylene sulfide) and poly(ether imide) in proportions of 50:50 to 95:10 in terms of a mass ratio of the total mass of the poly(ether ether ketone) and poly(phenylene sulfide) to poly(ether imide).

7. The secondarily formed product according to claim 1, wherein the carbon fiber is polyacrylonitrile based carbon fiber, pitch based carbon fiber, or a mixture thereof.

8. The secondarily formed product according to claim 1, wherein the resin composition comprises 60 to 85% by mass of the thermoplastic resin (A), 12 to 25% by mass of the carbon precursor (B) and 3 to 15% by mass of the conductive filler (C).

9. The secondarily formed product according to claim 1, wherein the secondarily formed product is obtained by cutting, drilling and/or shearing the extruded stock shape.

* * * * *